US008254285B2

(12) United States Patent
Siddha et al.

(10) Patent No.: US 8,254,285 B2
(45) Date of Patent: Aug. 28, 2012

(54) HARDWARE ABSTRACTION LAYER

(75) Inventors: Vividh Siddha, Milpitas, CA (US);
Kunihiro Ishiguro, Redwood City, CA (US); Guillermo A. Hernandez, San Jose, CA (US)

(73) Assignee: IP Infusion, Inc., San Jose, CA (US)

( * ) Notice: Subject to any disclaimer, the term of this patent is extended or adjusted under 35 U.S.C. 154(b) by 668 days.

(21) Appl. No.: 11/193,134

(22) Filed: Jul. 28, 2005

(65) Prior Publication Data

US 2006/0193266 A1    Aug. 31, 2006

Related U.S. Application Data

(60) Provisional application No. 60/656,756, filed on Feb. 25, 2005.

(51) Int. Cl.
*H04L 12/28* (2006.01)
(52) U.S. Cl. .................................................... 370/254
(58) Field of Classification Search .................. 370/254, 370/400, 401
See application file for complete search history.

(56) References Cited

U.S. PATENT DOCUMENTS

| | | | | |
|---|---|---|---|---|
| 6,311,288 | B1 * | 10/2001 | Heeren et al. | 714/4 |
| 6,385,197 | B1 * | 5/2002 | Sugihara | 370/380 |
| 6,601,186 | B1 * | 7/2003 | Fox et al. | 714/4 |
| 6,711,171 | B1 * | 3/2004 | Dobbins et al. | 370/400 |
| 6,907,039 | B2 * | 6/2005 | Shen | 370/400 |
| 2003/0120822 | A1 * | 6/2003 | Langrind et al. | 709/251 |
| 2006/0092901 | A1 * | 5/2006 | Parantainen | 370/342 |

OTHER PUBLICATIONS

Karlin, Scott and Peterson, Larry, "*VERA: An Extensible Router Architecture*," (2001 IEEE Apr. 27-28, 2001).
Berkowitz, H.; Davies, E.; Hares, S. Krishnaswamy, P.; Lepp, M., *Terminology for Benchmarking BGP Device Convergence in the Control Plan* (Jul. 19, 2004).
International Search Report dated Jun. 29, 2006, PCT/US2006/006792.
Notification of Second Office Action for Chinese patent application No. 200680006072.0, dated Dec. 27, 2010.
Chinese Office Action in Application No. 200680006072.0, dated Jun. 23, 2011.

* cited by examiner

*Primary Examiner* — Dang Ton
*Assistant Examiner* — Nourali Mansoury
(74) *Attorney, Agent, or Firm* — Nixon Peabody LLP

(57) ABSTRACT

Switching and routing functions may be provided in a data plane of a network switch by having all functions and algorithms needed to handle all related interface, logical and physical, under one interface manager to keep track of bindings between virtual interfaces and logical interfaces, as well as maintain the statuses of ports that belong to the virtual interface and the actual logical ports. When the actual interface goes down, the virtual interface may go down along with it. The bindings may also include definitions. All of these bindings may be located in a single routing information base (RIB) database, eliminating the need for multiple bindings to be kept in various places. Furthermore, a hardware abstraction layer in the control plane can also then be mirrored in the data plane, eliminating the need for the customer to create a layer performing the same tasks.

22 Claims, 2 Drawing Sheets

HARDWARE ABSTRACTION LAYER

CROSS-RELATION TO RELATED APPLICATION

This application claims priority based on Provisional Application Ser. No. 60/656,756, entitled "Hardware Abstraction Layer" by Vividh Siddha, Kunihiro Ishiguro and Willie Hernandez, filed on Feb. 25, 2005.

FIELD OF THE INVENTION

The present invention relates to the network switches. More specifically, the present invention relates to a hardware abstraction layer for use in a network switch architecture.

BACKGROUND OF THE INVENTION

A network switch is a hardware device for making and breaking a data connection between two endpoints. Switches may be employed to crate a virtual circuit between pairs of endpoints, fulfilling a role similar to that of a router in a connectionless network by diverting data packets toward their intended destination.

Switches traditionally have two software planes: a control plane and a data plane. The control plane is the portion of the system responsible for providing the actual functions and features of the system. The data plane is responsible for actually sending and receiving data to and from the ports that connect the switch to the outside world. In some cases, separate processors ("network processors") can also control these ports. From a purely architectural standpoint, the separation between the control plane and the data plane into different processors is system dependent, and may also be carried out in the operating system used on the switch.

Many prior art switches follow this separation of control plane and data plane. In order to facilitate the software specifically designed for the control plane, Application Programming Interfaces (APIs) have been utilized by additional software added to the control plane to interact with the data plane. These APIs are collectively referred to as the Hardware Abstraction Layer API (HAL API).

Local Area Network (LAN) technologies typically differentiate between switching functions and routing functions. Switching functions involve the transport of packets from a source port to a destination port using a Media Access Control (MAC) address of the Ethernet frame that encapsulates the data packet. These switches are often referred to as hubs. Routing, on the other hand, involves basing forwarding decisions based on an Internet Protocol (IP) address that is assigned to a computer. The Ethernet frame then encapsulates the IP packet and the IP address of the source and destination end-points. As a result, it takes longer to resolve packet destinations in a router than it does in a switch because the Ethernet frame has to be stripped out before the IP packet is processed.

Modern switching and routing systems may actually be combined to allow either switching of Ethernet frames based on the MAC address or the IP address. These capabilities are now embodied into the actual network processors used in the switching systems that control the ports of the system. Hence, new capabilities need to be added to the data plane to facilitate this new state-of-the-art combined functionality. Additionally, Virtual LANs enable the creation of virtual network topologies within the physical topology of the LAN. This enables the separation of data flows within the LAN using the same Ethernet physical links. From a topology perspective, the physical LAN topology and the Virtual LAN segments represent different Virtual LANs that are virtually independent, hence improving security.

The main drawback of these systems, however, comes in their design stage. Designers must implement the following components:

1. A mechanism for interfacing the routing and interface management with the control plane.

2. A mechanism to propagate configuration and logging functions from the control plane to the data plane.

3. A packet driver for control packet handling (a layer to intercept packets from the hardware components before they are passed to the data plane's IP forwarder/routing stack).

4. An exception packet handler (to capture control packets communicating topology information that the IP routing stack does not know how to handle, examine them, and forward them to an appropriate L2 protocol for further processing).

5. An interface manager layer (to facilitate the creation, handling, and management of virtual interfaces and maintain the bindings between virtual ports and physical ports, as well as handle the creation and management of aggregated physical ports into a virtual aggregated ports, the distribution of packets between these virtual ports, and maintain the administrative status of the virtual and physical port).

6. A component to mirror functions between the Hardware Abstraction Layer and the Hardware Integration Plane (to extend the HAL APIs to the data plane and provide a hardware based PI to interface to the actual hardware driver's APIs).

7. A software shim layer between the HIP API and the hardware driver's APIs (in the data plane) to translate the HIP API to the driver's APIs.

8. Chassis and stacking support, including a reliable data transport mechanism and a discovery mechanism.

9. Extending a management interface layer from the control plane into the data plane.

Placing this much burden on the designers of a switch increases their development costs as well as development time. Traditionally, these functions are performed ad-hoc without any consideration as to the interrelationships between the abstracted functions, in many cases creating unnecessary duplication of functions, data structures, and communication paths. Additionally, many times switch software is distributed to customers who need to customize them to work with their own hardware. Thus, the design burden for all of these components is placed on the customer. What is needed is a solution that does not require designers or customers to engage in such time consuming development.

BRIEF DESCRIPTION

Switching and routing functions may be provided in a data plane of a network switch by having all functions and algorithms needed to handle all related interface, logical and physical, under one interface manager to keep track of bindings between virtual interfaces and logical interfaces, as well as maintain the statuses of ports that belong to the virtual interface and the actual logical ports. When the actual interface goes down, the virtual interface may go down along with it. The bindings may also include definitions. All of these bindings may be located in a single routing information base (RIB) database, eliminating the need for multiple bindings to be kept in various places. Furthermore, a hardware abstraction layer in the control plane can also then be mirrored in the data plane, eliminating the need for the customer to create a layer performing the same tasks.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Figure 1:
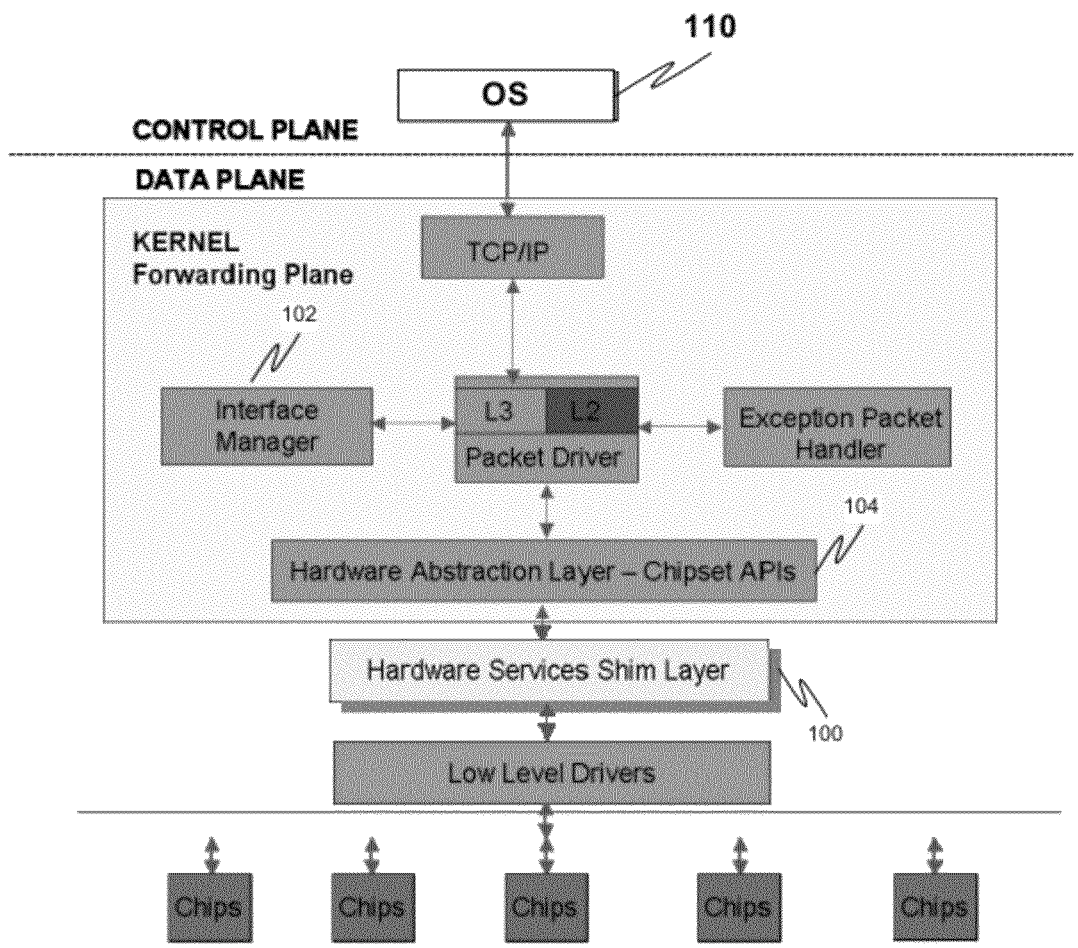
FIG. 1 is a diagram illustrating a network switch architecture in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Switching and routing functions may be provided in a data plane of a network switch by having all functions and algorithms needed to handle all related interface, logical and physical under one interface manager to keep track of bindings between virtual interfaces and logical interfaces, as well as maintain the statuses of ports that belong to the virtual interface and the actual logical ports. When the actual interface goes down, the virtual interface may go down along with it. The bindings may also include definitions. All of these bindings may be located in a single database, eliminating the need for multiple bindings to be kept in various places. The control plane handles all interfaces as if they were physical interfaces, thus improving control plane routing and forwarding decisions resulting in an increased performance, network resilliancy and network stability. Additionally, bindings may be married to actual physical chips. Furthermore, a hardware abstraction layer in the control plane can also then be mirrored in the data plane, eliminating the need for the customer to create a layer performing the same tasks. Furthermore, the Interface manager maintains a system wide forwarding information base (FIB) that is derived from the routing information base (RIB) residing in the control plane. A new next generation of network processors are emerging with the ability to also maintain internal Forwarding Database (FDB). The Network processors can then make forwarding decisions at wire speeds based on their internal forwarding database. The Network Processor's FDB is much smaller in it's overall capacity. As a result, they are capable of only maintaining a portion of the system wide FIB. When the network processors needs to forward a packet it looks in its internal FDB for a match destination MAC or IP address match. If it finds a match, it forwards the packet to the correct port. If a miss occurs, the NP forwards the packet to the data plane's packet handler. The packet hander examines the packet and checks if the IP stack can resolve the forwarding to the correct port, if not, the packet is passe to the Interface Manager. Since the Interface Manager maintains and up-to-data FIB, it has a higher probability of resolving the forwarding decision. If it does, it updates the NP FDB and also updates the IP stack's FIB using a direct access to the IP's FIB. This mechanism is unique and it enables much faster forwarding decisions and resolutions since the packets do not have to be forwarded to the control plane for further resolving the forwarding decision. Only when new hosts, network elements, or changes in the network topology occurs that packets need to be forwarded to the control plane for resolution.

The Packet handler also intercepts control packets and send them to the Packet Handler. The packet Handler then checks the type of control packets and if the packets are for L2 (Ethernet type control packets) the packet is passed to the Backend Socket Layer Packet Processor were it is then send to the correct L2 protocol for further processing. Control packets for routing protocols follow the normal IP based packet forwarding.

These functions when working together provide a marked improvement in performance and enables optimization of the forwarding capabilities of the new generation of Network Processors capable of forwarding packets in the Tera-bits per second range. Thus, switching and forwarding of data flows is performed at wire speeds with minimum packet delay, jitter and wonder.

A Platform Integration Architecture has been developed to facilitate the design of the next generation switching and routing systems. The Platform Integration Architecture provides a tighter coupling between the control plane and the data plane required to provide this new functionality. The two main components of the architecture are the Hardware Abstraction Layer (HAL) and the Hardware Integration Plane (HIP) component that resides in the data plane.

HAL/HIP software components form a Hardware Services Layer that uniquely binds the control plane and data plane. HAL/HIP APIs can be extended to add advanced functionality to system to take advantage of the new network processors that are providing advanced network functions such as MPLS, Multicast, and Quality of Services and Traffic Engineering.

With the HAL/HIP Hardware Services Layers system designers need to only provide the following:

1. Software shim layer between the HIP API and the hardware driver's APIs (in the data plane) to translate the HIP API to the driver's APIs.

FIG. 1 is a diagram illustrating a network switch architecture in accordance with an embodiment of the present invention.

The only software component that will need to be developed is the Hardware Services Shim Layer 100. This is accomplished by using the interface manager 102 to maintain bindings between virtual interface and logical interfaces, as well as their definitions, all in a single database in the data plane, as well as by replicating a hardware abstraction layer of the control plane on to a hardware abstraction layer 104 of the data plane.

Depending on the systems, this can represent between 40% to 50% of additional costs savings in system design and a potential reduction of time to market between 30% and 40%.

This data plane implementation enables highly modular, flexible and optimized integration of control plane protocols and applications with OS 110 and switching silicon platform. In this implementation, control plane protocols and applications are entirely abstracted from hardware, operating system 110 and system infrastructure and can work in any platform with the same data plane implementation transparently. Protocols and applications can be added or removed in a granular manner independent of the underlying platform.

This innovative implementation is based on a comprehensive architecture encompassing L2 ports, L3 interfaces, aggregates (L2 or L3), Switched-Virtual-Interface, and all possible L2/L3/VLAN/aggregate hierarchies. All these interfaces and hierarchy are represented to the control plane logically isolating all hardware platform details. The flexibility in changing the system configuration via single shell command allows accommodating the fast changing L2/L3 switching needs especially when network operators incorporate additional advanced functionality such as VoIP, video streaming, security and wireless.

This advanced implementation may be architected with a distributed data plane and a central redundant control plane. The implementation auto-discovers hardware system topology and elects master/slave instances in supporting fully distributed data plane in a stackable or chassis based systems while having a single point of management.

The implementation based on this advanced data plane architecture is highly transferable across different switching platforms allowing high degree of implementation re-use and more importantly quick time-to-market when developing new products. This has the following benefits:

1. Control plane protocols and applications are entirely abstracted from HW, OS and system infrastructure in a unique and innovative way and can work across different hardware platforms and operating systems transparently. The implementation based on this advanced data plane architecture is highly transferable across different switching platforms allowing high degree of implementation re-use and more importantly quick time-to-market when developing new products.

2. Protocols and applications can be added or removed in a granular manner independent of the underlying platform.

3. This innovative implementation is based on a "holistic" approach which encompasses L2 ports, L3 interfaces, aggregates (L2 or L3), Switched-Virtual-Interface, and all possible L2/L3/VLAN/aggregate hierarchies. In this unique approach, all these interfaces and hierarchy are represented to the control plane logically isolating all hardware platform details.

4. The innovative L2/L3 integration approach provides the flexibility in changing the system configuration via single shell command to allow accommodating the fast changing L2/L3 switching needs especially when network operators incorporate additional advanced functionality such as VoIP, video, security and wireless.

5. The innovative approach preserves all of the above benefits (control plane being hw platform independent, control plane being modular, unique L2/L3 hybrid implementation, etc.) while allowing distributed data plane with a central control plane implementation for maximum performance and scalability by means of the unique manner in which the FIBs of the IP stack and the NP FDBs are updated and entries aged by the carefully crafted Interface Manager, Packet Exception Handler, and the HAL APIs.

This may all be accomplished by having the interface manager keep track of bindings between virtual interfaces and logical interfaces, as well as maintain the statuses of ports that belong to the virtual interface and the actual logical ports while at the same time maintaining an FIB constantly updated by the Control Plane RIB. When the actual interface goes down, the virtual interface may go down along with it. The bindings may also include definitions. All of these bindings may be located in a single database, eliminating the need for multiple bindings to be kept in various places. Additionally, bindings may be married to actual physical chips and the FIB/RIB bindings can be quickly updated as network topology changes ensue.

The hardware abstraction layer of the control plane can also then be mirrored in the data plane, eliminating the need for the customer to create a layer performing the same tasks.

Figure 2:
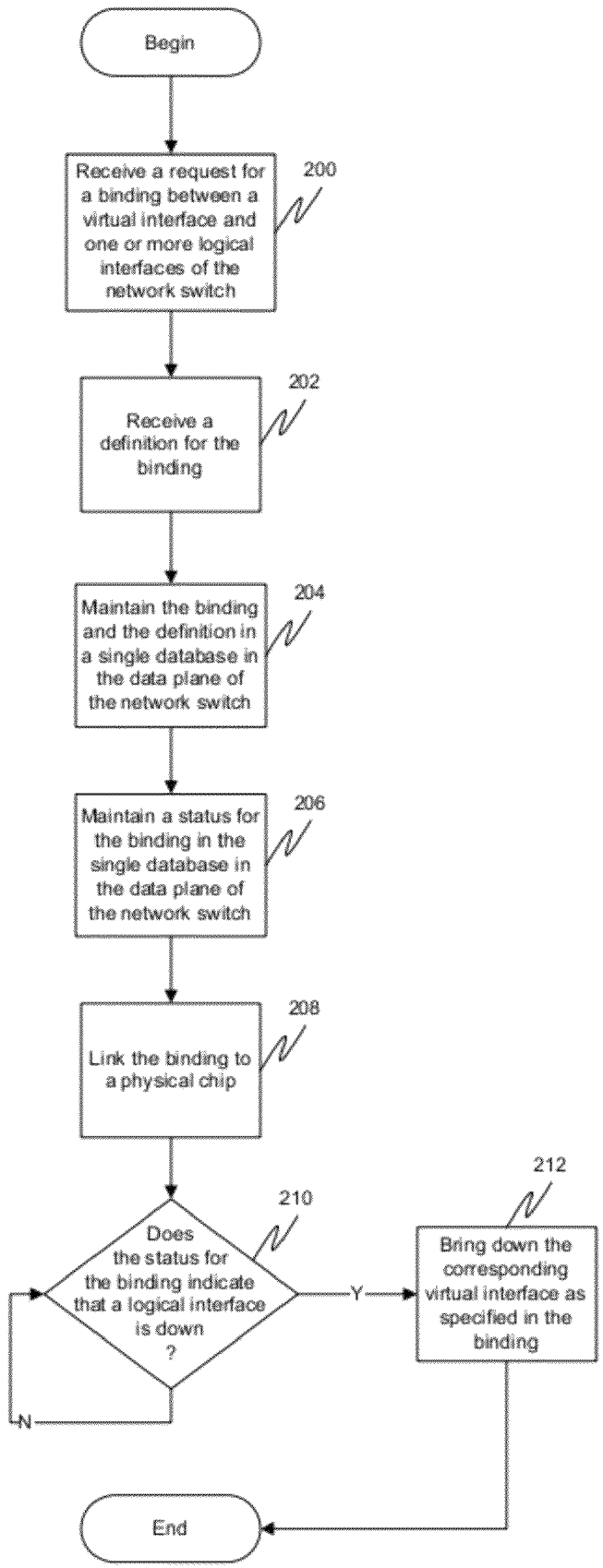
FIG. 2 is a flow diagram illustrating a method for providing switching and routing functions in a data plane of a network switch in accordance with an embodiment of the present invention.

FIG. 2 is a flow diagram illustrating a method for providing switching and routing functions in a data plane of a network switch in accordance with an embodiment of the present invention. Each act of the method may be performed in hardware, software, or any combination thereof. At 200, a request for a binding between a virtual interface and one or more logical interfaces of the network switch may be received. The binding may include information regarding ports of the network switch that belong to the virtual interface. At 202, a definition for the binding may be received. At 204, the binding and the definition may be maintained in a single RIB database in the control plane and a derived FIB in the data plane of the network switch. At 206, a status for the binding may also be maintained in the single database in the data plane of the network switch. At 208, the binding may be linked to a physical chip.

At 210, it may be determined if the status for the binding indicates that a logical interface is down. If so, then at 212, a corresponding virtual interface as specified by the binding may be brought down. The RIB and FIB are immediately updated and topology changes propagated to the rest of the network.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
at an interface manager in a data plane of a network switch, receiving a request for a binding between a virtual interface and one or more logical interfaces of the network switch, the data plane coupled to a control plane of the network switch;
receiving a definition for the binding at the interface manager in the data plane;
maintaining the binding and the definition for the binding, in a single database in the data plane of the network switch, wherein when a particular one of the one or more logical interfaces goes down, a corresponding virtual interface specified by the binding is brought down; and
updating forwarding databases for chips of network processors and a forwarding information base for an IP stack coupled to the network switch.

2. The method of claim 1, further comprising:
maintaining a status for the binding in the single database in the data plane of the network switch.

3. The method of claim 1, wherein the binding is information regarding ports of the network switch that belong to the virtual interface.

4. The method of claim 2, further comprising:
if the status for the binding indicates that a logical interface is down, bringing down a corresponding virtual interface as specified by the binding.

5. The method of claim 1, further comprising:
linking the binding to a physical chip.

6. The method of claim 1, further comprising:
replicating a hardware abstraction layer from a control plane of the network switch on the data plane of the network switch.

7. The method of claim 1, wherein the single database is the forwarding information base and the method further comprises:
deriving the forwarding information base from a routing information base.

8. A network switch comprising:
a control plane; and
a data plane coupled to the control plane and containing an interface manager, wherein the interface manager is configured to:
receive a request for a binding between a virtual interface and one or more logical interfaces of the network switch;
receive a definition for the binding; and
maintain the binding and the definition for the binding in a single database in the data plane of the network switch, wherein when a particular one of the one or more logical interfaces goes down, a corresponding virtual interface specified by the binding is brought down; and
update forwarding databases for chips of network processors and a forwarding information base for an IP stack coupled to the network switch.

9. The network switch of claim 8, wherein the interface manager is further configured to maintain a status for the binding in the single database in the data plane of the network switch.

10. The network switch of claim 8, wherein the binding is information regarding ports of the network switch that belong to the virtual interface.

11. The network switch of claim 9, wherein the interface manager is further configured to bring down a corresponding virtual interface as specified by the binding if the status for the binding indicates that a logical interface is down.

12. The network switch of claim 8, wherein the interface manager is further configured to link the binding to a physical chip.

13. The network switch of claim 8, wherein the control plane includes a hardware abstraction layer and the data plane further includes a replicated version of the hardware abstraction layer.

14. The network switch of claim 8, wherein the single database is the forwarding information base and the interface manager is further configured to derive the forwarding information base from a routing information base.

15. An apparatus comprising:
means for receiving a request in a data plane for a binding between a virtual interface and one or more logical interfaces of a network switch;
means for receiving a definition for the binding in the data plane; and
means for maintaining the binding and the definition for the binding in a single database in the data plane of the network switch, wherein when a particular one of the one or more logical interfaces goes down, a corresponding virtual interface specified by the binding is brought down; and
means for updating forwarding databases for chips of network processors and a forwarding information base for an IP stack coupled to the network switch.

16. The apparatus of claim 15, further comprising:
means for maintaining a status for the binding in the single database in the data plane of the network switch.

17. The apparatus of claim 15, wherein the binding is information regarding ports of the network switch that belong to the virtual interface.

18. The apparatus of claim 16, further comprising:
if the status for the binding indicates that a logical interface is down, means for bringing down a corresponding virtual interface as specified by the binding.

19. The apparatus of claim 15, further comprising:
means for linking the binding to a physical chip.

20. The apparatus of claim 15, further comprising:
means for replicating a hardware abstraction layer from a control plane of the network switch on the data plane of the network switch.

21. The apparatus of claim 15, wherein the single database is the forwarding information base and the apparatus further comprises:
means for deriving the forwarding information base from a routing information base.

22. A program storage device readable by a machine, tangibly embodying a program of instructions executable by the machine to perform a method, the method comprising:
at an interface manager in a data plane of a network switch, receiving a request for a binding between a virtual interface and one or more logical interfaces of the network switch, the data plane coupled to a control plane of the network switch;
receiving a definition for the binding at the interface manager in the data plane; and
maintaining the binding and the definition for the binding in a single database in the data plane of the network switch, wherein when a particular one of the one or more logical interfaces goes down, a corresponding virtual interface specified by the binding is brought down; and
updating forwarding databases for chips of network processors and a forwarding information base for an IP stack coupled to the network switch.

\* \* \* \* \*